United States Patent
Rappoport et al.

(10) Patent No.: US 8,930,366 B2
(45) Date of Patent: Jan. 6, 2015

(54) METHOD AND SYSTEM FOR AUTOMATICALLY RANKING PRODUCT REVIEWS ACCORDING TO REVIEW HELPFULNESS

(75) Inventors: Ari Rappoport, Jerusalem (IL); Oren Tsur, Tel-Aviv (IL)

(73) Assignee: Yissum Research Development Comapny of the Hebrew University of Jerusalem Limited, Jerusalem (IL)

( * ) Notice: Subject to any disclaimer, the term of this patent is extended or adjusted under 35 U.S.C. 154(b) by 578 days.

(21) Appl. No.: 12/812,205

(22) PCT Filed: Jan. 11, 2009

(86) PCT No.: PCT/IL2009/000039
§ 371 (c)(1),
(2), (4) Date: Oct. 4, 2010

(87) PCT Pub. No.: WO2009/087636
PCT Pub. Date: Jul. 16, 2009

(65) Prior Publication Data
US 2011/0040759 A1      Feb. 17, 2011

Related U.S. Application Data

(60) Provisional application No. 61/020,294, filed on Jan. 10, 2008.

(51) Int. Cl.
*G06F 17/30* (2006.01)
(52) U.S. Cl.
CPC ...... *G06F 17/3069* (2013.01); *G06F 17/30663* (2013.01)

USPC ............... 707/737; 707/748; 707/E17.089; 707/E17.044

(58) Field of Classification Search
USPC .................................... 707/737, 748
See application file for complete search history.

(56) References Cited

U.S. PATENT DOCUMENTS

| | | | |
|---|---|---|---|
| 7,962,461 B2* | 6/2011 | Ruhl et al. | 707/706 |
| 2005/0144162 A1* | 6/2005 | Liang | 707/3 |
| 2006/0143158 A1* | 6/2006 | Ruhl et al. | 707/3 |
| 2007/0078845 A1* | 4/2007 | Scott et al. | 707/5 |
| 2007/0185861 A1* | 8/2007 | Budzik et al. | 707/5 |
| 2008/0215571 A1* | 9/2008 | Huang et al. | 707/5 |
| 2008/0249764 A1* | 10/2008 | Huang et al. | 704/9 |

* cited by examiner

*Primary Examiner* — Shyue Jiunn Hwa
(74) *Attorney, Agent, or Firm* — Stroock & Stroock & Lavan LLP (57) ABSTRACT

A method and system for automatically ranking product reviews according to review helpfulness. Given a collection of reviews, the method employs an algorithm that identifies dominant terms and uses them to define a feature vector representation. Reviews are then converted to this representation and ranked according to their distance from a 'locally optimal' review vector. The algorithm is fully unsupervised and thus avoids costly and error-prone manual training annotations. In one embodiment a Multi Layer Lexical Model (MLLM) approach partitions the dominant lexical terms in a review into layers, creates a compact unified layers lexicon, and ranks the reviews according to their weight with respect to unified lexicon, all in a fully unsupervised manner. When used to rank book reviews, it was found that the invention significantly outperforms the user votes-based ranking employed by Amazon.

15 Claims, 3 Drawing Sheets

METHOD AND SYSTEM FOR AUTOMATICALLY RANKING PRODUCT REVIEWS ACCORDING TO REVIEW HELPFULNESS

CROSS-REFERENCE TO RELATED APPLICATIONS

This application is a is a national stage application under 35 U.S.C. 371 based on and claiming the benefit of International Application Serial No. PCT/IL2009/000039 filed on Jan. 11, 2009 which claims the benefit of priority from U.S Provisional Application No. 61/020,294 filed Jan. 10, 2008 the entire contents of each of which are incorporated herein by reference.

FIELD OF THE INVENTION

This invention relates to lexical ranking.

REFERENCES

[1]. Anindya Ghose and Panagiotis G. Ipeirotis. 2007. Designing novel review ranking systems: predicting the usefulness and impact of reviews. In *ICEC '07: Proceedings of the ninth international conference on Electronic commerce*, pages 303-310, New York, N.Y., USA. ACM.

[2]. Andrew B. Goldberg and Xiaojin Zhu. 2006. Seeing stars when there arent many stars: Graph-based semisupervised learning for sentiment categorization. In *HLT-NAACL 2006 Workshop on Textgraphs: Graphbased Algorithms for Natural Language Processing*.

[3]. D. Higgins, J. Burstein, and Y. Attali. 2006. Identifying off-topic student essays without topic-specific training data. *Nat. Lang. Eng.*, 12(2):145-159.

[4]. Minqing Hu and Bing Liu. 2004. Mining and summarizing customer reviews. In *KDD '04: Proceedings of the tenth ACM SIGKDD international conference on Knowledge discovery and data mining*, pages 168-177, New York, N.Y., USA. ACM.

[5]. Soo-Min Kim, Patrick Pantel, Timothy Chklovski, and Marco Pennacchiotti. 2006.

[6]. Automatically assessing review helpfulness. In *Proceedings of the Conference on Empirical Methods in Natural Language Processing (EMNLP)*, pages 423-430.

[7]. Wei-Hao Lin and Alexander Hauptmann. 2006. Are these documents written from different perspectives?: a test of different perspectives based on statistical distribution divergence. In *ACL '06: Proceedings of the 21st International Conference on Computational Linguistics and the 44th annual meeting of the ACL*, pages 1057-1064, Morristown, N.J., USA. Association for Computational Linguistics.

[8]. Jingjing Liu, Yunbo Cao, Chin-Yew Lin, Yalou Huang, and Ming Zhou. 2007. Low-quality product review detection in opinion summarization. In *Proceedings of the 2007 Joint Conference on Empirical Methods in Natural Language Processing and Computational Natural Language Learning (EMNLP-CoNLL)*, pages 334-342.

[9]. Bo Pang, Lillian Lee, and Shivakumar Vaithyanathan. 2002. Thumbs up?Sentiment classification using machine learning techniques. In *Proceedings of the 2002 Conference on Empirical Methods in Natural-Language Processing(EMNLP)*, pages 79-86.

[10]. Ana-Maria Popescu and Oren Etzioni. 2005. Extracting product features and opinions from reviews. In *HLT '05: Proceedings of the conference on Human Language Technology and Empirical Methods in Natural Language Processing*, pages 339-346, Morristown, N.J., USA. Association for Computational Linguistics.

[11]. G. Salton and M. J. McGill. 1983. *Introduction to Modern Information Retrieval*. McGraw-Hill New York, N.Y.

[12]. Wiebe, Janyce, Theresa Wilson, Rebecca Bruce, Matthew Bell, and Melanie Martin. 2004. Learning subjective language. *Computational Linguistics*, 30(3):277-308, January.

[13]. Turney, Peter D. 2002. Thumbs up or thumbs down? semantic orientation applied to unsupervised classification of reviews. In *ACL '02: Proceedings the 40th annual meeting of the ACL*, volume 40, page 417.

[14]. Dave Kushal, Steve Lawrence, and David M. Pennock. 2003. Mining the peanut gallery: opinion extraction and semantic classification of product reviews. In *WWW '03: Proceedings of the 12th international conference on World Wide Web*, pages 519-528, New York, N.Y., USA. ACM.

[15]. McDonald, Ryan and Hannan, Kerry and Neylon, Tyler and Wells, Mike and Reynar, Jeff. June 2007. Structured Models for Fine-to-Coarse Sentiment Analysis. In *Proceedings of the 45th Annual Meeting of the Association of Computational Linguistics*, pages 432-439.

[16]. John Blitzer and Mark Dredze and Fernando Pereira. 2007. Biographies, Bollywood, Boom-boxes and Blenders. Domain Adaptation for Sentiment Classification. In *Association for Computational Linguistics*.

BACKGROUND OF THE INVENTION

The World Wide Web contains a wealth of opinions on just about anything. Online opinions come in various shapes and sizes, from short and informal talkback comments through opinionated blog postings to long and argumentative editorials. An important type of opinionated postings is the kind dedicated to product reviews in Internet forums. In this era of user-generated content, writing product reviews is a widespread activity. People's buying decisions are significantly influenced by such product reviews. However, in many cases particularly for popular products, the number of reviews may be large, which causes many reviews to be left unnoticed (there are thousands of reviews on the popular books). As a result, there is an increasing interest in opinion mining and review analysis, with the goal of automatically finding the most helpful reviews. In order to help users find the best reviews, some websites (e.g., amazon.com) employ a voting system in which users can vote for review helpfulness ("was this review helpful to you? yes/no"). However, user voting mechanisms suffer from various types of bias, including the imbalance vote bias (users tend to value others' opinions positively rather than negatively), the winner circle bias (reviews with many votes get more attention and therefore accumulate votes disproportionately), and the early bird bias (the first reviews to be published tend to get more votes) (Liu et al. [7]).

Analysis of product reviews typically involves several different aspects. Wiebe et al. [12] learn to identify opinionated documents (reviews) by assigning a subjectivity score to each document. Subjectivity scores are learnt from an annotated corpus. Polarity of sentiment is a well-studied aspect. For example, Pang et al., [9] compare different machine learning algorithms for sentiment classification of movie reviews. Turney [13] and Kushal et al. [14] classify reviews according to the polarity of the sentiment expressed. Turney [13] uses the average semantic orientation of the review in order to classify its polarity. The semantic orientation is calculated by mutual information between adverbs and adjectives in the review and the words 'poor' and 'excellent', while Kushal et al. [14] use WordNet and other heuristics for the same purpose. McDonald et al. [15] present a model for fine-to-coarse sentiment analysis from the sentence level to the review level and (Goldberg and Zhu [2]) use graph theory to learn review sentiment from a sparsely labeled corpus. Blitzer et al. [17] present an algorithm for domain adaptation of sentiment analysis.

Another area of interest in review analysis is review summarization, where (Hu and Liu, [4]) extract product features and output a sentiment-based summary-like list of product features and sentences that describe them. Popescu and Etzioni [10] use their KnowItAll system to improve upon (Hu and Liu [4]).

A few studies learn the quality of the reviews. Liu et al. [8] identify low quality reviews in order to improve the summarization of sentiment regarding product features. Kim et al. [5] predict the helpfulness of a review by structural features such as length, lexical features, and meta-data such as rating summary (star rating at amazon.com). Review subjectivity (where "the reviewer gives a very personal description of the product") was used to predict helpfulness in (Ghose and Ipeirotis [1]).

Broadly taken, reader reviews can be thought of as essays with the target of the reviews as their topic. Off-topic (i.e. irrelevant) student essays were identified based on lexical similarity in (Higgins et al. [3]). From a different point of view, product reviews are opinions on the product stated from various perspectives. The different perspectives expressed in documents were distinguished based on their statistical distribution divergence in (Lin and Hauptmann [7]).

Kim et al. [5] used lexical features of three types: a version of the tf-idf measure, product features extracted from Pro/Con listings on epinions.com and sentiment words from publicly available lists. Their features also include metadata such as the stars rating.

In order to train a binary classifier that identifies poor quality reviews of electronic products, (Liu et al. [8]) employed four annotators, each annotator following very detailed instructions in the course of annotating thousands of reviews. Having thousands of reviews annotated and ranked by one evaluator might be problematic, since after a few dozen reviews it is hard for the evaluator to assess the true helpfulness of a review due to cognitive load by information learnt from previous reviews. It would therefore represent an improvement over the approach proposed by Liu et al. [8] to provide a fully unsupervised review that avoids the use of pre-made lists of sentiment words and other features altogether. It would also represent an improvement to obviate the need for preprocessing proposed by Popescu and Etzioni [10] who use parsers, NER systems and POS taggers in a preprocessing stage. Avoiding preprocessing systems is a clear advantage since these systems are usually trained on well-written corpora, and thus tend to perform poorly on freely-formed user generated content such as book reviews.

US20020069190 discloses a method for ranking a set of documents, comprising the steps of: gathering context information from the documents; generating at least one rank criterion from the context information; and ranking the documents, based on the at least one rank criterion. The method is based on loop-back or feedback provided by user re-evaluation of the dominant concepts.

WO0146821A 1 discloses a computer program that indicates lexical impact of various words in a text and provides various statistics relating to lexical impact of the text. Also, a ranked thesaurus for listing alternative words (e.g., synonyms, antonyms, related), along with an indication of their relative lexical impact. The thesaurus may alternatively rank words according to ranking system.

SUMMARY OF THE INVENTION

It is an object of the invention to provide an improved method for ranking product reviews that addresses at least some of the drawbacks associated with known approaches.

In accordance with a broad aspect, the invention uses the given collection of reviews in order to define a reference locally optimal review. The locally optimal review is not the best possible review on this product, but is in some sense the best review that can be extracted from the given collection (hence our usage of the term 'local', since the locally optimal review may change with the addition of a single new review). We do not generate the locally optimal review explicitly; all reviews, including the locally optimal review, are represented as feature vectors. The feature set is the set of dominant terms contained in the reviews (the locally optimal lexicon), so that vector coordinates correspond to the overall set of dominant terms. Reviews are then ranked according to a similarity metric between their vectors and the locally optimal vector.

According to a specific embodiment of the invention there is provided a novel Multi-Layer Lexical Model (MLLM) approach for content analysis, which is especially suitable for product reviews. The main idea in MLLM is to partition the dominant lexical terms in reviews into different layers. The type and granularity of layers depends on the application. We focus here on three layers relevant for book reviews, corresponding to book reviews in general, specific book genres, and specific books. Our approach is fully unsupervised and no annotated data is required.

Based on the proposed Multi-Layer Lexical Model, the invention provides a system that automatically ranks book reviews according to their estimated helpfulness. We experimented with Amazon reviews on books from several genres, showing that our system outperforms the user votes based model employed by Amazon.

The works discussed above mine and analyze reviews of electronic products, which tend to have only a small number of features discussed in reviews (typically found in semi-structured specification sheets). On the other hand, book reviewers tend to express themselves more poetically and discuss many aspects of authoring, such as author style, genre, plot, moral aspects of the story, existential feelings of the characters, and ideas communicated implicitly by the author. Not only are these much harder to extract, they are also much harder to define.

The invention differs from (Kim et al. [5]) in a number of ways. First, the invention is fully unsupervised. Secondly, while the invention is able to rank product reviews, which have a fairly sparse lexicon, it is also able to deal with books, where Pro/Cons lists are not available. Thirdly, the invention defines rich and flexible lexical layers, not only those specifically mentioned in the product specs and in Pros/Cons lists. Furthermore, the method according to the invention for feature extraction is radically different and does not require any external precompiled lists. Most notably, while (Kim et al. [5]) measure success by correlation with the Amazon user votes-based ranking, the approach according to the invention follows (Liu et al. [8]) and argues that this gold-standard is biased, therefore we employ human evaluators in order to evaluate our system against the user-vote baseline.

Another difference between some of the works discussed above and the approach according to the invention is that in addition to binary classification into 'helpful' and 'not helpful', the system according to the invention inherently provides a continuous scale (soft) grading, which may be useful for some applications. Moreover, the review ranking of the invention can easily be adapted to match different criteria such as review length.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Overview

In classic information retrieval, a document is represented as a bag of words, and each word in each document is assigned a score (typically tf-idf (Salton and McGill [11])) that reflects the word's importance in this document. In one aspect, the invention uses the score to identify dominant terms and uses them to define a feature vector representation. Reviews are then converted to this representation and ranked according to their distance from a 'locally optimal' review vector. In another aspect, the invention takes this approach a step further, by building different lexicons for various review layers. These lexicons enable a compact document representation highly suitable for review analysis, demonstrated here with regard to the task of review ranking.

The Locally Optimal Lexicon

Lexical items (one word or more) are associated with the locally optimal lexicon according to their dominance. As with above-mentioned tf-idf, dominant terms are not necessarily the most frequent terms in the reviews collection. The dominant concepts are versatile and usually cover a wide range of semantic types that are not determined explicitly in any way.

Review Representation and the Locally Optimal Review

The compact lexicon of the dominant concepts is now used for two purposes. First, it defines a feature vector representation of reviews. Coordinates of the vector correspond to the dominant concepts. Each review r 2 Rp is mapped to yr in this representation such that a coordinate k is 1 or 0 depending on whether or not the review r contains the $k^{th}$ dominant term. The second conceptual usage of the locally optimal lexicon is to define a locally optimal feature vector (LOFV), which is simply the feature vector having 1 in all of its coordinates. LOFV represents all reviews that make use of all of the dominant terms. In one non-limiting embodiment, both the LOFV and all of the vr's weights are all set to 1, providing excellent results.

Important types include words common to product reviews in general, such as 'excellent'; words common to reviews of certain types of products (e.g., books and movies), such as 'boring' and 'masterpiece'; words common to reviews of books of certain genres, such as 'thriller' and 'nonfiction'; book specific terms such as names of main characters and concepts related to the plot (e.g., 'Langdon', 'albino' and 'the holy grail' for the Da Vinci Code). There are also references to other relevant concepts, such as 'Foucault's Pendulum', 'Angles and Demons', 'Christianity', 'historical', 'fictional' (again, for the *Da Vinci Code*).

In order to identify the dominant terms, we use a balanced corpus B of general English (we used the British National Corpus (BNC)). This resource is not specific to our problem and does not require any manual effort. Given a corpus Rp consisting of reviews for product p, the dominance of a lexical item t in Rp is given by:

$$D_{Rp}(t) = fR_p(t) \cdot c \cdot \frac{1}{\log B(t)} \quad (1)$$

where fRp(t) is the frequency of term t in Rp, B(t) is the average number of times t appears per one million words in the balanced corpus (BNC in our case), and the constant c is a factor used to control the level of dominance 1. The lexicon is constructed ignoring stop words. Equation 1 is designed to capture the key concepts that are dominant in the collection Rp, balancing the bias induced by frequent words, capturing words of different semantic types and capturing words that are dominant but infrequent. Once each term has a dominance score, we choose the m most dominance lexical items to create a compact locally optimal lexicon. Based on a small development set (reviews for only two books not participating in the test), we used m=200. Clearly, m could be determined dynamically to achieve optimal results for different products, but we leave this for future research. In principle, lexical items may have different dominance weights (e.g., given by their score or by their semantic type), allowing several specific ranking schemes.

Figures 1, 2:
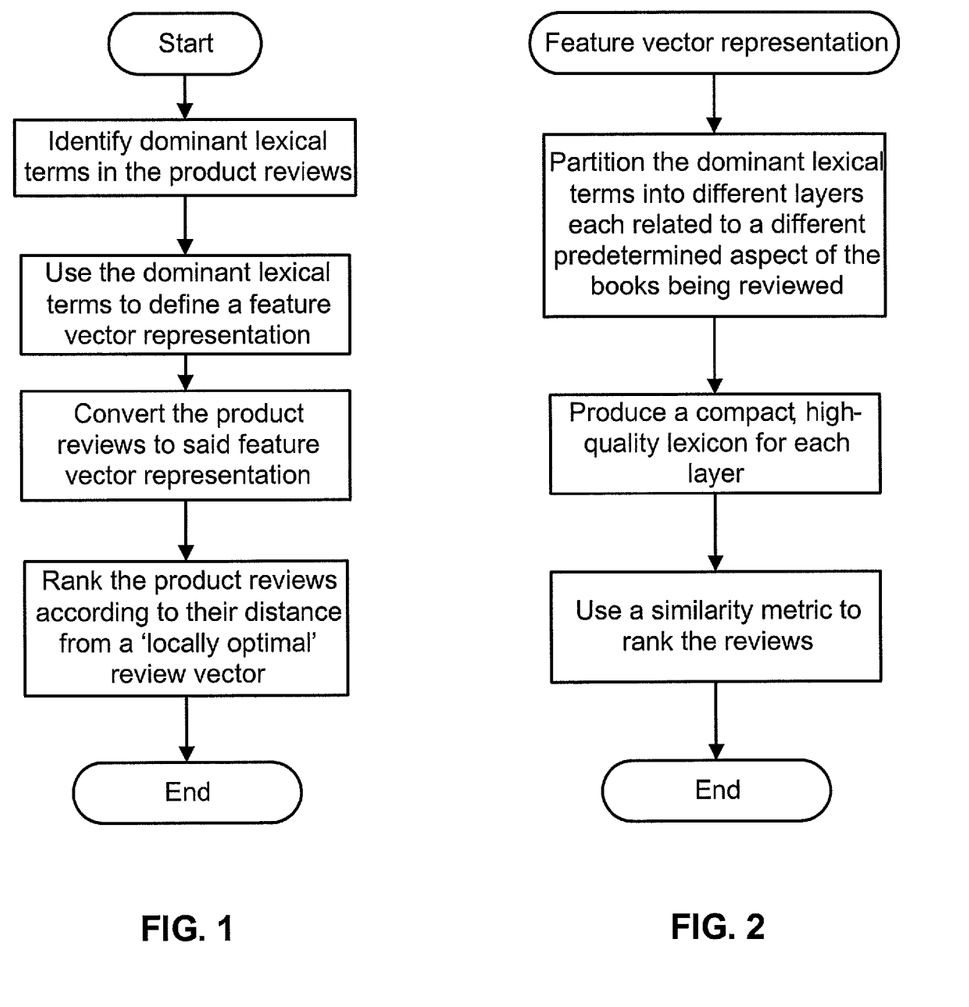
FIGS. 1 and 2 are flow diagrams showing the principal operations carried out by a method according to the invention for ranking product reviews.

The above procedure may be extended to create multilayer lexicons as will now be described and shown in FIGS. 1 and 2 showing the principal operations carried out by a method according to the invention for ranking product reviews.

In the invention, a layer is a level of abstraction of a review. In one embodiment according to the invention, each layer i is represented by a lexicon Li, computed using a layer reference corpus (LRC) Ri. Unless explicitly said otherwise, we equate a layer with its lexicon for convenience.

In accordance with one embodiment of the invention, four layers are defined of which the last three are utilized. The most abstract layer (number 0) contains a lexicon of words that are common in product reviews in general. For example, words relating to sentiments such as 'great', 'recommend', 'disappointing' and 'amazing' belong to this layer. When used only for book reviews and not on general product reviews, this layer is not utilized. However, it is to be understood that the invention is capable of assessing reviews of products other than books and the claims are therefore not intended to be limited to any one kind of product review. Layer number 1 contains words that correspond to book reviews in general, such as 'book' and 'author'. The intermediate layer (number 2) corresponds to a specific book genre. For example, words such as 'murder' and 'detective' are typical for the suspense thrillers genre. The most specific layer (number 3) includes lexical items that belong to the reviews of a specific title. For example, 'Langdon', 'the holy grail', and 'knights Templars' belong to layer 3 of *The Da Vinci Code*.

Note that lexical items in layer 3 do not necessarily appear in the book itself. A challenge of the invention is to create a compact lexicon for each layer. The naïve approach is to try to create a large representative reference corpus for each book and genre type, and base the layers upon it. However, this might lead to an imbalanced set of reviews, which would yield a biased lexicon, especially for the more abstract layers.

The invention overcomes these problems, producing a compact yet high-quality lexicon for each layer. The core idea is first to create a biased lexicon for each layer, and then refine these lexicons by set operations (intersection and complement) between them. This way there is no need for a very large body of reviews of thousands of books. We show that a few dozen books are sufficient to achieve good results.

The ranking algorithm according to the invention has five main stages, described in detail in this section:
1. Build a (biased) lexicon for each of the layers.
2. Refine the lexicons.
3. Integrate layer lexicons to create a unified lexicon having the desired granularity.
4. Compute the layers representation of the given reviews.
5. Use some similarity metric to rank the reviews.

Creating Lexicons

The process of lexicon construction is the same for all layers; only the layer reference corpus (LRC) changes between layers. Lexical items are associated with layer lexicons according to their dominance in that layer, computed using the LRC. Dominance is inspired by the traditional tf-idf (Salton and McGill [11]) metric commonly used in information retrieval. As with tf-idf, dominant words are not necessarily the most frequent in their layer.

Our formula uses a balanced corpus B of general English (we used the British National Corpus (BNC)). The dominance of a lexical item t in layer i is given by:

$$D_i(t) = fR_i(t) \cdot c \cdot \frac{1}{\log B(t)} \quad (2)$$

where fRi(t) is the frequency of t in Ri. The layer reference corpus Ri consists of a collection of reviews that together specify the layer's level of abstraction. For example, for layer 2 (the genre specific layer) we might use reviews of several science fiction books. B(t) is the average number of times t appears per one million words in the balanced corpus (BNC in our case), and the constant c is a factor used to control the level of dominance (it should be tuned according to the balanced corpus used). In our experiments we used c=3 so that terms with frequency lower than 0.1% in the BNC will have $$c \cdot \frac{1}{\log BNC(t)} > 1.$$

When using 1 as a dominance threshold, as c increases, more words are considered to be less dominant.

Ri, the collection of reviews comprising the layer reference corpus, depends on the layer level of abstraction. In our most abstract layer (1), $R_1$ is a collection of reviews for a few dozen books from various genres, while $R_3$ is the collection of reviews for the specific book. The intermediate layers (2) are based on collections of reviews for books of the same genre. Lexicons are constructed ignoring stop words, i.e. small, frequently-used words that are so common they are meaningless in a search. The number of layers can be adjusted by the level of the desired granularity. For example, layers can be defined for books of a certain genre, only for positive/negative reviews, or for other more sophisticated classifications, such as a layer of reviews that include an explicit comparison to another product.

We have found that three layers are sufficient for helpfulness ranking. Once each term has a dominance score in each layer, we choose the m most dominant lexical items in each layer, creating a compact lexicon. Based on a small development set (some reviews for two books not participating in the test), we used m=200 for all layers, yielding excellent results. Clearly, each layer could have a different m.

Automatic Lexicon Refinement

Lexical items of a more abstract (lower numbered) layer can appear as noisy "stop words" in another layer. Once we have a lexicon for each layer, we can remove such noisy "stop words" and extract the layer-specific items. We do this by set operations (complement and intersection) between the different lexicons. This might result in some loss if the removed words are also important in this specific book. For example, 'character' and 'humor' are part of the lexicon in our layer 1 for *The Moon is a Harsh Mistress*, but the word 'humor' is also strongly related to the book's message. However, this does not pose a problem since enough words remain in layer 3.

Let $L_i^I$ be the initial lexicon for layer i (created in stage 1). $L_i$ (the final, 'clean' lexicon for layer i) is given by:

$$L_i = (L_i^I \cap L_{i+1}^I)/(L_{i+1}^I \cap L_{i-1}^I) \quad (3)$$

for i i∈{0, . . . , n} and where $L_{-1}^I = \phi$ and $L_{n+1}^I = L_n^I$. Table 1 shows examples of a few features from each layer lexicon for two titles. The layer 1 reference corpus consists of reviews from 22 books (the same 22 books for both titles). The layer 2 reference corpora consist of *The Da Vinci Code*, *Foucault's Pendulum*, and *The God Delusion* for *The Da Vinci Code*, and of *The Moon is a Harsh Mistress*, *Ender's Game*, and *The Hitchhiker's Guide to the Galaxy* for *The Moon is a Harsh Mistress*. Layer 3 uses only the reviews for the book in the column's title.

TABLE 1

| Layer | The Da Vinci Code | The Moon is a Harsh Mistress |
|---|---|---|
| 1 | fictional, historical, religious, provoking, predictable | storyline, recommend, enjoyable, believable, protagonist |
| 2 | christianity, constantine, murder, theological, puzzles | scifi, earth, futuristic, troopers, libertarian, lunar |
| 3 | albino, langdon, nicea, templar, harvard, cryptologist | tanstaafl, mike, computer, technician, revolution, convict, ideals |

Unified Lexicons and Review Representation

We now integrate the lexicons to create one unified lexicon that is tailored to the specific book and yet captures dominant lexical items of more abstract layers. If n is the most specific layer and wi is a weight of importance assigned to layer i, $UL_b$, the unified lexicon for the reviews of book b, is $$UL_b = \bigcup_{i=0}^{n} w_i \times L_i \quad (4)$$

For simplicity, we have used uniform weights. In this case, the refinement stage can be skipped, unless we are interested in examining the lexicons separately, as done for creating Table 1.

The lexical items in $UL_b$ constitute a feature vector that contains the dominant terms that have a high relative frequency in their layer. This feature vector in effect serves as a prototype for the lexicon of a 'good' review.

Next, each review is represented by the features it contains. Features can be ordered in some hierarchy. However, as shown below, it is sufficiently distinctive to give all features an equal weight, creating a normalized vector space. Since features have equal weights, the representation can simply be collapsed to a single integer, the number of features appearing in the review. This integer is a rough approximation of the number of important pieces of information given in this review.

Review Ranking

A good book review presents the potential reader with enough information without being verbose. Therefore each review is given a score by the following formula:

$$S(r) = \frac{1}{p(|r|)} \cdot \frac{d_r}{|r|} \quad (5)$$

where dr is the weighted number of lexical features from $ULM_b$ contained in review r, |r| is the number of words in the review and p(|r|) is a penalty factor given by:

$$p(|r|) = \begin{cases} c & |r| < |\bar{r}| \\ 1 & \text{otherwise} \end{cases} \quad (6)$$

A penalty factor is needed in order to penalize reviews that are too short or too long. In one embodiment, c was set to 20, to deliberately create a high threshold for reviews that are too short. The function p( ) could be adjusted to penalize or favor long reviews as the user prefers, as explained in greater detail below. In our experiments we assumed that users tend to get annoyed by verbose reviews; the penalty for an excessive length being already given by the denominator |r| (Equation 4).

Evaluation Setup and Results

Evaluation Procedure

In order to test the MLLM approach, we used the task of review ranking. Helpfulness is in the eye of the beholder. A book review in the New York Times or at salon.com differs in length, style and depth from a book review posted in retail sites like Amazon.com. Obviously, the forum at which a review is posted influences the expectations of the users (the potential readers). We define a helpful review in a somewhat open way:

A good (helpful) book review presents the potential reader with sufficient information regarding the book's topic/plot/writing-style/context or any other criteria that might help him/her in making a rational decision on whether or not s/he wants to read the book.

We compared user votes-based ranking to the ranking used by the present invention, and assessed performance by asking human evaluators to rate the reviews. User votes-based ranking is affected by two factors: the total number of votes a review receives, and the ratio between the number of helpful votes and the total number of votes. This policy is reasonable since a review that has a single 'helpful' vote (100% of the votes are positive) cannot be automatically considered more helpful than a review with helpful/total ratio of 281/301. We used an approximation to the user votes based-ranking employed by Amazon, ranking reviews that have more than 15 votes such that their helpful/total ratio is over 0.5 higher than reviews with a slightly better ratio but under 15 total votes. In a similar way, we ranked reviews with more than 30 votes and a majority of positive votes above those with less than 30 votes.

We tested our system on five books from five different genres, using the Amazon API to obtain the reviews. The books are: *The Da Vinci Code*, historical fiction (by Dan Brown); *the World is Flat*, nonfiction (by Thomas Friedman); *Harry Potter and the Order of the Phoenix*, fantasy (by J K Rowling); *Ender's Game*, science fiction (by Orson Scott Card), and *A Thousand Splendid Suns*, fiction (by Khaled Hosseini). All five books are worldwide bestsellers and enjoy many Amazon reviews. Table 2 below presents some details about the reviews of these books. The table shows that the books differ in almost every aspect: genre, number of reviews, average review length, and average number of votes.

TABLE 2

| Book | NoR | Length | T-Votes | Lex-F |
|------|-----|--------|---------|-------|
| DVC  | 3481 | 175.3 | 15.5 | 11.1 |
| WiF  | 1025 | 195.4 | 14.1 | 14.4 |
| HP5  | 5000 | 182.8 | 3.4  | 17.3 |
| EG   | 2433 | 146.5 | 2.6  | 15.9 |
| TSS  | 784  | 120   | 4.6  | 14.8 |

The symbols used in Table 2 are as follows:
NoR: Number of Reviews.
Length: average number of words in a review.
T-Votes: average number by Amazon users of total votes for a book (i.e., both positive and negative reviews).
Lex-F (Lexical Features): the average number of lexical features found by the invention in a review.
DVC: The Da Vinci Code;
WiF: The World is Flat;
HP: Harry Potter and the Order of the Phoenix;
EG: Ender's Game;
TSS: A Thousand Splendid Suns.

The purpose of our evaluation is three-fold. First, we verify that user-votes helpfulness ranking is biased. Secondly, we demonstrate that ranking based on the invention succeeds in finding helpful reviews among Amazon reviews that received no user votes at all. Finally, we show that the ranking according to the invention is preferable even when compared to the top 2% reviews ranked according to user votes.

The evaluation process is as follows. For each of the five books, we created four batches of six reviews each. Each batch was compiled as follows: two reviews were randomly sampled from the top 2% or 5% of the user votes-based reviews, two reviews were randomly sampled from the top 2 (or 5) % of reviews as ordered by the system according to the invention, and two reviews (serving as a control set) were randomly sampled from the reviews that are not included in the top 2 (or 5) % reviews of the user votes-based ranking (some of them could be very helpful, but they had not accumulated enough votes). To reduce noise, our preference was to use the top 5%. However, in three of the books in our experiments, only the top 2% reviews had more than 15 votes each with a helpfulness ratio higher than 0.5.

Table 3 tabulates averages over the top reviews of the user votes-based ranking (UV) and the system according to the invention, using the same nomenclature as that used in Table 2 above.

TABLE 3

| Product | System | Length | T-Votes | LexF |
|---|---|---|---|---|
| DVC | UV | 308.6 | 103.8 | 16.7 |
|  | Invention | 279.1 | 51.4 | 24.7 |
| WiF | UV | 335.5 | 94.4 | 14.1 |
|  | Invention | 334.4 | 10.6 | 25.6 |
| HP5 | UV | 345.4 | 51.2 | 27.7 |
|  | Invention | 211.8 | 1.7 | 30.7 |
| EG | UV | 379.5 | 60.52 | 31.3 |
|  | Invention | 188.9 | 2.3 | 33.1 |
| TSS | UV | 400.8 | 46.5 | 34.6 |
|  | Invention | 142.7 | 3.5 | 24.5 |
| All books | UV | 353.8 | 71.3 | 124.4 |
|  | Invention | 202.8 | 13.8 | 27.7 |

Each batch of six reviews was given to three human evaluators to rank the reviews according to helpfulness, assigning 6 to the most helpful review and 1 to the least helpful review.

Overall, we sampled 24 reviews for each book, 120 reviews in total. Each to review was evaluated by three different evaluators, thus producing 360 evaluations. Each evaluator was given only one batch of six reviews for a book, in order to prevent him/her from being cognitively loaded with information in a way that might interfere with his/her judgment.

Inter-Evaluator Agreement

Inter-evaluator agreement in this evaluation task is somewhat tricky. Each evaluator is asked to assign each review with a number between 1 and 6. Reviews differ in style and coverage. Evaluators differ in their expectations and tolerance for different review styles. Given the fact that the range of evaluation scores was 1 to 6, and given the different personal preferences of the evaluators and the open style of review writing, it cannot be expected that evaluators will show strict uniformity. It is therefore reasonable to define a soft measure of agreement. We define agreement as follows. Denote by $e_i$ the three evaluators of review r, and by score the function $score(e,r):\{e1; e2; e3\}\times\{r\in R\}\rightarrow\{1,\ldots,6\}$. Then $agr(e_1, e_2, e_3):=1$ iff $$\forall i \neg \exists j\ score(e_i,r)-score(e_j,r)>2 \quad (7)$$

Otherwise, $agr(e_1, e_2, e_3)=0$. Table 4 below tabulates the percentage of inter-evaluator agreement for d=2 and Fleiss-kappa statistics for d=1; 2, showing that for 73.3% of the total of 120 evaluated reviews, there was complete agreement between three evaluators, substantial agreement for d=2 and quite a good agreement for d=1. Fleiss-kappa is a common statistic that measures agreement between multiple evaluators.

TABLE 4

| Book | IE Agreement | kappa (d = 2) | kappa (d = 1) |
|---|---|---|---|
| DVC | 75% | 0.75 | 0.57 |
| WiF | 79% | 0.79 | 0.65 |
| HP5 | 83% | 0.69 | 0.5 |
| EG | 71% | 0.71 | 0.46 |
| TSS | 58% | 0.64 | 0.57 |
| Overall | 73.3% | 0.69 | 0.56 |

Figure 3:
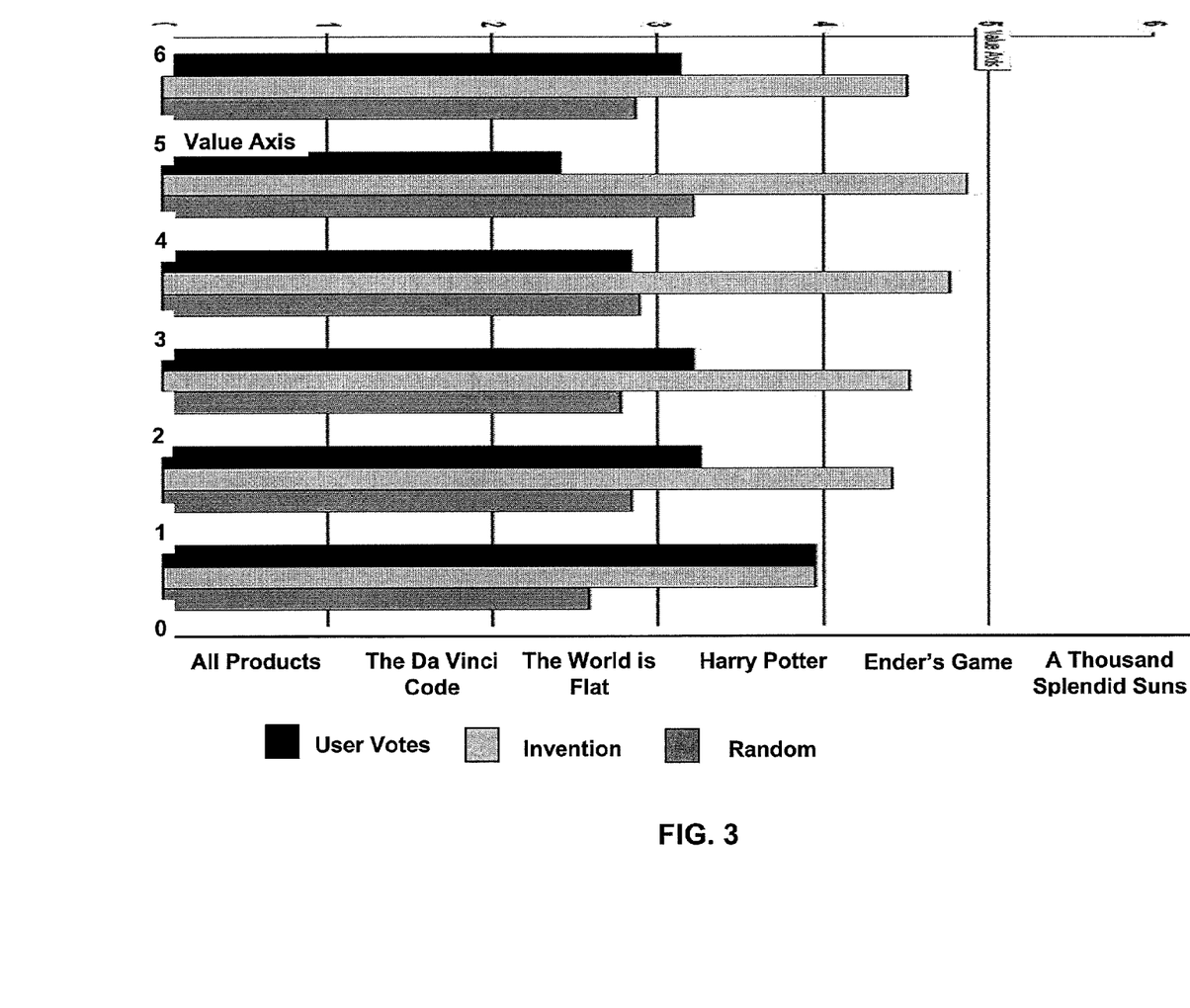
FIG. 3 is a graphical representation comparing the performance of the system according to the invention to the user votes ranking and to a random sample.

FIG. 3 presents the performance of the system according to the invention compared to the user votes ranking and to a random sample. The system according to the invention system clearly significantly outperforms both of these methods. Note in Table 3 that the average number of votes for the top reviews ranked by the system according to the invention is only 13.8, while the top user-based reviews have an average of 71.3 votes. This shows that the system according to the invention indeed recognizes worthy reviews overlooked by users.

Examining the evaluators' choice of a single most helpful review in each batch shows that a review obtained by the system according to the invention was ranked the most helpful in 85% of the batches.

Comparing our subjects' appraisal of user-based ranking to the control set shows that the former is only slightly better than the latter. These results, along with the difference in the average number of votes (Table 3), confirm that user-based ranking is problematic.

Figure 4:
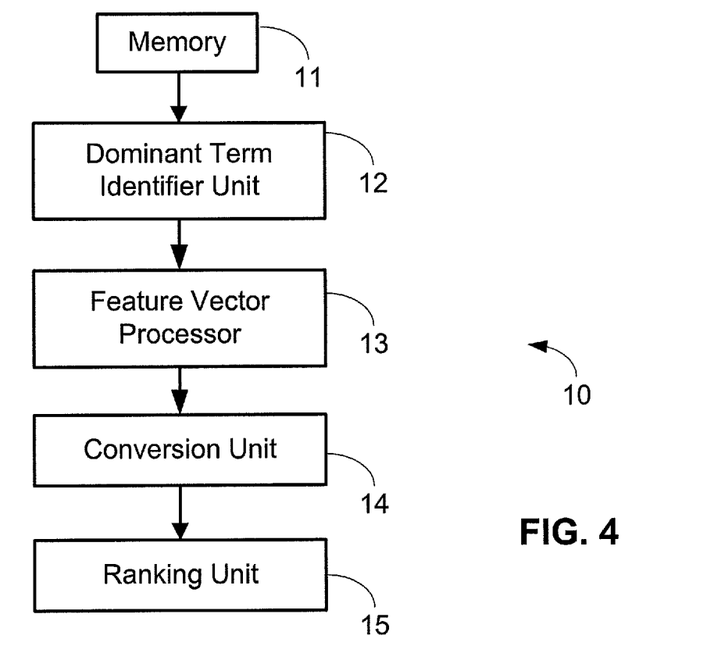
FIG. 4 is a block diagram showing functionality of a system according to the invention for ranking product reviews.

FIG. 4 shows functionally a system 10 according to the invention for automatically ranking product reviews stored in a computer-readable memory 11. The system 10 comprises a dominant term identifier unit 12 that may be coupled to the memory 11 for identifying dominant lexical terms in the product reviews. A feature vector processor 13 coupled to the dominant term identifier unit processes the dominant lexical terms to define a feature vector representation. A conversion unit 14 coupled to the feature vector processor converts the product reviews to the defined feature vector representation, and a ranking unit 15 coupled to the conversion unit 14 ranks the product reviews according to their distance from a 'locally optimal' review vector.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Discussion

Although our system performs significantly better than the user vote-based ranking system, there is one book (*A Thousand Splendid Suns*) on which both rankings are evaluated similarly. This difference between the clear advantage of the system according to the invention on four of the books and the draw on the fifth book can be explained by differences in average review length. Table 2 shows that while the average length of reviews for the first four books is 175 words per review, the average length for *A Thousand Splendid Suns* is only 120 words. The ranking algorithm used by the invention balances the length of the review and the number of pieces of information it conveys, and as such, it favors shorter reviews relative to the average length of the reviews for the book in question (see Equation 5). Apparently, human evaluators (and readers) tend to prefer reviews that are longer than a certain constant, 150 words approximately. This can be easily supported by the invention by adjusting the penalty factor (Equation 5) to be:

$$p(|r|) = \begin{cases} c & |r| < |\bar{r}|\ \text{or}\ |r| < l \\ 1 & \text{otherwise} \end{cases} \quad (8)$$

where l is a constant determining a lower bound on the length of a helpful review. Equation 8 can be also used to fit the preferences of a specific user who prefers shorter or longer reviews.

While most of the reviews selected by the system according to the invention obtained an average rank of 4.5, review 664 for *The World is Flat*, sampled for the $6^{th}$ batch, has an average evaluator rank of 2 (two of the three evaluators ranked it as the least helpful review in the batch). Table 5 shows an excerpt from the review itself, revealing that this review is a parody, criticizing the book's extensive and repetitive use of buzz-words. The reviewer used all the right terms but deliberately misplaced them in order to form sentences that are extremely incoherent, hence not presenting the reader any explicit information about the book. This review was ranked relatively high by the system according to the invention due to the fact that the system learns lexicons using a bag of words approach, and is thus insensitive to the order of the words. It is also worth noting that this review got 15 votes from Amazon users, 13 of which were 'helpful'. These votes make a helpfulness ratio of 87%. The review did not obtain such a high helpful score by the user-based baseline because it did not accumulate enough votes (over 30), but apparently many readers liked the parody and thought that the message it conveys is helpful.

TABLE 5

Flattening Flatteners are flattening the world . . .

I listened to Tom Friedman's book on CD, and this is what it sounded like: "I realized the world was flat when the flattening flatteners converged and flattened the world into flatness. Flatteners one through ten flattened the world but when they converged into convergence with a TCP/IP SOAP XML in-source outsource delivery flattening, the flatness became overriddingly flat and converged. Google TCP/IP XML Y2K India China middle-class 5 billion convergence extremely flat world flattening. Do flattening flatteners converge and make things flatter? Yes, I gave CEO X, worldclass flattener, my flattener theory in his offices . . . " In fairness, the book is a good piece of scholarship and shoe leather, and Friedman does help educate a good portion of the world on how all these forces intertwine. But hearing the book on CD makes you see how Friedman hammers this stuff over and over again like a two-by-four to the middle of your forehead.

Using the Text of the Book Itself

The multi-layer approach can also be used for tasks other than review ranking, using a partitioning method that can be combined with that described above. Suppose we are given the full text of the book itself, in addition to its reviews. The review features of the present invention can now be automatically divided into three main groups as follows. First we create a simplified lexicon of the book, identifying lexical items that are frequent in it and lexical items that are infrequent yet dominant (using Equation 2). We now partition the features in the unified lexicon $UL_b$ of the reviews into three main groups. The first group contains features that are frequent in the book. These are typically names of the main characters and the main themes.

The second group contains features that are infrequent, yet dominant, in the book. These features capture some essence of the book or some strong characteristics of the characters or the idea of the book. For example, the word tanstaafl appears only 6 times in The Moon is a Harsh Mistress, and yet, this word is the implicit motto of the book. The characterization of Langdon as a Harvard Professor or of Silas as an albino is something that is mentioned very few times in The Da Vinci Code but has a strong effect on the readers.

Finally, there are features that do not appear in the book at all. Beside sentiment words, these include terms that may broaden the horizon of readers by referring them to further reading (for example, references to Umberto Eco in the reviews of The Da Vinci Code) or to other relevant information (for example, the council of Nicea is not mentioned in The Da Vinci Code at all but does serve as the historical setting to the book, so it is important for a deeper understanding of it).

Conclusion

The algorithm according to the invention identifies a compact lexicon that captures the most prominent features of a review along with rare but significant features. The algorithm is robust and performs well on different genres as well as different products, such as electronic products, while using small and imbalanced corpora. The algorithm is fully unsupervised, avoiding the annotation bottleneck typically encountered in similar tasks. When applied to book reviews, which vary in style greatly, the algorithm according to the invention can present a book from very many perspectives and in many different contexts. The Multi Layer Lexical Model according to the present invention provides a novel approach for information mining from book reviews. Deconstruction of the reviews to various lexicons according to a desired granularity before recombining the lexicons to one unified lexicon allows the ranking system to identify the most relevant features in each layer, resulting in a compact lexicon that captures the most trivial and prominent features of a review along with rare but profound features.

The invention claimed is:

1. A computer-implemented method for automatically ranking product reviews relating to a product of interest stored in a computer-readable memory according to the estimated helpfulness of the product reviews, said method comprising:
    identifying dominant lexical terms in the product reviews;
    using the dominant lexical terms to define a feature vector representation;
    converting the product reviews to said feature vector representation; and
    ranking the product reviews according to the distance of the product reviews from a 'locally optimal' review vector;
wherein:
    lexical terms are assigned a dominance score based on statistical occurrence of words in the product reviews and general literature that is not specific to the subject matter of the product reviews;
    the dominance score of lexical terms that appear in the product reviews and are also commonly found in the general literature are assigned different values compared to lexical terms that appear in the product reviews but are not commonly found in the general literature; and
    the dominance score Di(t) of a lexical item t in a layer i is given by:

$$Di(t) = fRi(t) \cdot c \cdot \frac{1}{\log B(t)}$$

where fRi(t) is the frequency of t in Ri,
    B(t) is the average number of times t appears per one million words in the balanced corpus, and
    c is a factor used to control the level of dominance;
    so as to capture key concepts that are dominant in the collection Ri, balancing bias induced by frequent words, capturing words of different semantic types and capturing words that are dominant but infrequent.

2. The method according to claim 1, wherein using the dominant lexical terms to define a feature vector representation includes:
   partitioning the dominant lexical terms into different layers each related to a different predetermined aspect of the products being reviewed;
   producing a compact, high-quality lexicon for each layer, and
   using a similarity metric to rank the reviews.

3. The method according to claim 2, wherein producing a compact, high-quality lexicon for each layer includes:
   creating a biased lexicon for each layer, and
   refining the biased lexicons by applying set operations between them so as to generate respective refined layer lexicons.

4. The method according to claim 2, further including:
   integrating the refined layer lexicons to create a unified lexicon having a desired granularity; and
   computing the layers representation of the given reviews.

5. The method according to claim 1, wherein the first lexicon is computed as:

$$L_i = (L_i^I \cap L_{i+1}^I)/(L_{i+1}^I \# L_{i-1}^I)$$

where $L_i^I$ is an initial lexicon for layer i and $L_i$ is a final, 'clean' lexicon for layer i.

6. The method according to claim 1, when used to rank product reviews.

7. A system for automatically ranking product reviews relating to a product of interest stored in a computer-readable memory according to the estimated helpfulness of the product reviews, said system comprising:
   a dominant term identifier unit for identifying dominant lexical terms in the product reviews;
   a feature vector processor coupled to the dominant term identifier unit for processing the dominant lexical terms to define a feature vector representation;
   a conversion unit coupled to the feature vector processor for converting the product reviews to said feature vector representation; and
   a ranking unit coupled to the conversion unit for ranking the product reviews according to the distance of the product reviews from a 'locally optimal' review vector;
   wherein:
   the dominant term identifier unit is responsive to statistical occurrence of words in the product reviews and general literature that is not specific to the subject matter of the product reviews for assigning a dominance score to lexical terms in the product reviews;
   the dominant term identifier unit adjusts the dominance score of lexical terms that appear in the product reviews and that are also commonly found in the general literature so as to assign different values thereto compared to lexical terms that appear in the product reviews but are not commonly found in the general literature; and
   the dominance score Di(t) of a lexical item t in a layer i is given by:

$$Di(t) = fRi(t) \cdot c \cdot \frac{1}{\log B(t)}$$

where fRi(t) is the frequency of t in Ri,
   B(t) is the average number of times t appears per one million words in the balanced corpus, and
   c is a factor used to control the level of dominance;

so as to capture key concepts that are dominant in the collection Ri, balancing bias induced by frequent words, capturing words of different semantic types and capturing words that are dominant but infrequent.

8. A computer-implemented method for automatically ranking product reviews stored in a computer-readable memory according to the estimated helpfulness of the product reviews, said method comprising:
   identifying dominant lexical terms in the product reviews;
   using the dominant lexical terms to define a feature vector representation;
   converting the product reviews to said feature vector representation;
   ranking the product reviews according to the distance of the product reviews from a 'locally optimal' review vector; and
   removing words from a first lexicon of a first layer that are better associated with a second lexicon of a second layer by applying set operations between the first and second lexicons;
   wherein:
   lexical terms are identified as dominant based on statistical occurrence of words in the product reviews and general literature that is not specific to the subject matter of the product reviews; and
   the first lexicon is computed as:

$$L_i = (L_i^I \# L_{i+1}^I)/(L_{i+1}^I \# L_{i-1}^I)$$

where $L_i^I$ is an initial lexicon for layer i and $L_i$ is a final, 'clean' lexicon for layer i.

9. The method according to claim 8, wherein using the dominant lexical terms to define a feature vector representation includes:
   partitioning the dominant lexical terms into different layers each related to a different predetermined aspect of the products being reviewed;
   producing a compact, high-quality lexicon for each layer, and
   using a similarity metric to rank the reviews.

10. The method according to claim 9, wherein producing a compact, high-quality lexicon for each layer includes:
    creating a biased lexicon for each layer, and
    refining the biased lexicons by applying set operations between them so as to generate respective refined layer lexicons.

11. The method according to claim 10, further including:
    integrating the refined layer lexicons to create a unified lexicon having a desired granularity; and
    computing the layers representation of the given reviews.

12. The method according to claim 8, when used to rank product reviews.

13. A system for automatically ranking product reviews stored in a computer-readable memory according to the estimated helpfulness of the product reviews, said system comprising:
    a dominant term identifier unit for identifying dominant lexical terms in the product reviews;
    a feature vector processor coupled to the dominant term identifier unit for processing the dominant lexical terms to define a feature vector representation;
    a conversion unit coupled to the feature vector processor for converting the product reviews to said feature vector representation;
    a ranking unit coupled to the conversion unit for ranking the product reviews according to the distance of the product reviews from a 'locally optimal' review vector;

removing words from a first lexicon of a first layer that are better associated with a second lexicon of a second layer by applying set operations between the first and second lexicons;

wherein:

lexical terms are identified as dominant based on statistical occurrence of words in the product reviews and general literature that is not specific to the subject matter of the product reviews; and the first lexicon is computed as:

$$L_i = (L_i^I \# L_{i+1}^I)/(L_{i+1}^I \# L_{i-1}^I)$$

where $L_i^I$ is an initial lexicon for layer i and $L_i$ is a final, 'clean' lexicon for layer i.

14. A non-transient computer readable memory having stored thereon computer program code which when run on a computer performs a method for automatically ranking product reviews relating to a product of interest stored in a computer-readable memory according to the estimated helpfulness of the product reviews, said method comprising:

identifying dominant lexical terms in the product reviews;

using the dominant lexical terms to define a feature vector representation;

converting the product reviews to said feature vector representation; and ranking the product reviews according to the distance of the product reviews from a 'locally optimal' review vector;

wherein:

lexical terms are assigned a dominance score based on statistical occurrence of words in the product reviews and general literature that is not specific to the subject matter of the product reviews;

the dominance score of lexical terms that appear in the product reviews and are also commonly found in the general literature are assigned different values compared to lexical terms that appear in the product reviews but are not commonly found in the general literature; and the dominance score Di(t) of a lexical item t in a layer i is given by:

$$Di(t) = fRi(t) \cdot c \cdot \frac{1}{\log B(t)}$$

where fRi(t) is the frequency of t in Ri,

B(t) is the average number of times t appears per one million words in the balanced corpus, and c is a factor used to control the level of dominance;

so as to capture key concepts that are dominant in the collection Ri, balancing bias induced by frequent words, capturing words of different semantic types and capturing words that are dominant but infrequent.

15. A non-transient computer readable memory having stored thereon computer program code which when run on a computer performs a method for automatically ranking product reviews stored in a computer-readable memory according to the estimated helpfulness of the product reviews, said method comprising:

identifying dominant lexical terms in the product reviews;

using the dominant lexical terms to define a feature vector representation;

converting the product reviews to said feature vector representation;

ranking the product reviews according to the distance of the product reviews from a 'locally optimal' review vector; and removing words from a first lexicon of a first layer that are better associated with a second lexicon of a second layer by applying set operations between the first and second lexicons;

wherein:

lexical terms are identified as dominant based on statistical occurrence of words in the product reviews and general literature that is not specific to the subject matter of the product reviews; and the first lexicon is computed as:

$$L_i = (L_i^I \# L_{i+1}^I)/(L_{i+1}^I \# L_{i-1}^I)$$

where $L_i^I$ is an initial lexicon for layer i and $L_i$ is a final, 'clean' lexicon for layer i.

* * * * *